March 6, 1962    N. W. SCHUBRING    3,023,609
FLAW DETECTION APPARATUS
Filed June 4, 1958
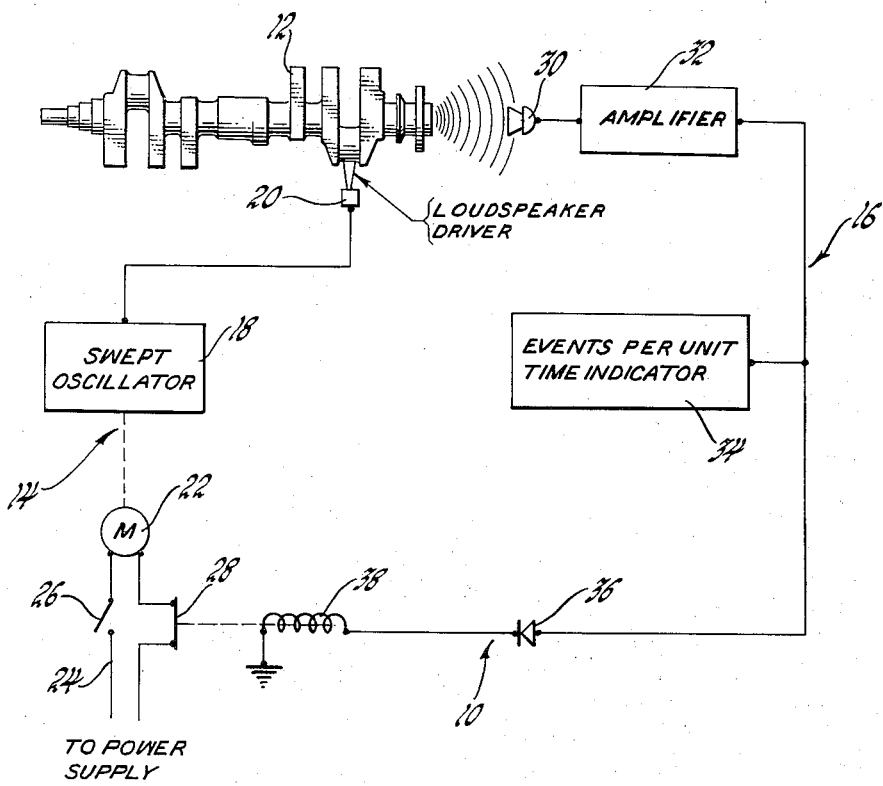
INVENTOR.
Norman W. Schubring
BY
E. W. Christen
ATTORNEY

United States Patent Office 3,023,609
Patented Mar. 6, 1962

3,023,609
FLAW DETECTION APPARATUS
Norman W. Schubring, Hazel Park, Mich., assignor to General Motors Corporation, Detroit, Mich., a corporation of Delaware
Filed June 4, 1958, Ser. No. 739,894
7 Claims. (Cl. 73—67.2)

The present invention relates to testing of workpieces for flaws therein and, more particularly, to means for acoustically determining the presence of any hidden defects in the workpieces.

When producing highly stressed members such as crankshafts, etc., it is essential that each and every member be free from any hidden defects such as cracks, blow holes, etc. These members are normally sufficiently complex to have a plurality of natural resonant frequencies with each of these frequencies being dependent upon the characteristics of the member. Accordingly, any defects in the workpiece will alter one or more of these natural resonant frequencies. Therefore, the presence of such defects may be detected by measuring the resonant frequency or frequencies of the member and determining whether or not they fall within certain prescribed limits. One means for accomplishing this is to induce variable frequency vibrations in the member and to observe the increase in the vibrations that occurs during resonant conditions. At best this is a slow and tedious process and not infrequently one or more of the resonant points has a sufficiently high Q to produce such a narrow band of increased vibrations as to escape detection by the operator.

It is now proposed to provide a simple and reliable means for automatically determining the resonant frequencies of a workpiece and thereby eliminate the foregoing difficulties. More particularly, this is to be accomplished by providing a sweep frequency oscillator which will automatically scan a prescribed frequency spectrum and induce vibrations corresponding thereto in the workpiece. A pickup is provided which is responsive to the amplitude of the vibrations induced in the workpiece and which is effective to stabilize the frequency of the oscillator whenever the amplitude of the induced vibrations is greater than some predetermined amount. Under these circumstances, a resonant condition exists and the frequency thereof will be indicated on a suitable meter until such time as the operator reinstitutes the scanning operation. It may thus be seen that this apparatus will automatically detect each and every natural resonant frequency of the workpiece.

In the one sheet of drawings:
The FIGURE is a block diagram of a testing apparatus embodying the present invention.

Referring to the drawing in more detail, the present invention is particularly adapted to be embodied in a testing apparatus 10 for inspecting workpieces 12 such as crankshafts for internal combustion engines. It should be noted that workpieces 12 of this nature normally have a plurality of natural resonant frequencies, each of which is a fundamental mode.

This apparatus 10 includes a means 14 for inducing variable frequency mechanical vibrations in the workpiece 12 and a means 16 for sensing the vibrations that are induced. The vibration inducing means 14 includes a variable or sweep frequency oscillator 18 that is interconnected with a suitable transducer 20 for converting the electrical oscillations into mechanical vibrations in the workpiece 12. It has been found that a loudspeaker driver is particularly well adapted for this use if all of the resonant points in the workpiece are included in the audio range.

The frequency of the oscillator 18 may be automatically controlled by any suitable electronic or mechanical means. However, in the present instance, an electric drive motor 22 is provided for causing the frequency of the oscillator 18 to gradually increase across a frequency spectrum which includes all of the important natural resonant points present in the workpiece 12. The operation of the motor 22 is controlled by a power circuit 24 having a manually controlled On-Off switch 26 and a normally closed relay controlled switch 28.

The means 16 for observing the vibrations in the workpiece includes a pickup 30 such as a microphone which may be placed against or adjacent to the workpiece 12 so as to sense any vibrations present therein. The output of the pickup 30 is interconnected with an amplifier 32 that is adapted to increase the amplitude of the signal from the pickup 30 to a more useful level. The output of the amplifier 32 is interconnected with a frequency or events per unit time indicator 34 that is effective to indicate the frequency of the induced vibrations in the workpiece 12 as sensed by the pickup 30.

In addition, the output of the amplifier 32 is also interconnected with a rectifier 36 and the coil 38 for the relay controlled switch 28. Normally, the switch 28 will be retained closed whenever the current in the relay coil 38 is less than some predetermined amount. In the event the output of the amplifier 32 and the current in the relay coil 38 are greater than some predetermined amount, the relay will open the switch 28, stop the motor 22 and cause the frequency of the oscillator 18 to become constant. The amount of the frequency will be indicated by the frequency meter 34.

In order to employ this apparatus 10 for testing a workpiece 12 such as a crankshaft for defects, the workpiece 12 is placed in a suitable support (not shown). The transducer or driver 20 and the pickup 30 are positioned to induce vibrations in the workpiece 12 and to sense the vibrations therein respectively. The drive motor 22 is then energized so as to cause the frequency of the oscillator to gradually increase across the frequency spectrum that is being scanned. When the frequency of the oscillator 18 is equal to a resonant frequency of the workpiece 12, the mechanical vibrations therein will increase beyond some predetermined amplitude. When this occurs the output from the amplifier 32 will increase to a sufficient level to energize the relay coil 38. This will in turn open the switch 28 in the power circuit 24 of the drive motor 22. This will result in the frequency of the oscillator 18 being maintained substantially constant and equal to a resonant frequency of the workpiece 12. This frequency will be indicated on the meter 34. The operator may then observe and/or record this frequency and again energize the drive motor 22. This will restart the scanning operation which will continue until the frequency of the oscillator 18 is again equal to another resonant condition in the workpiece 12.

After the sweep frequency oscillator 18 has completely swept the entire frequency spectrum, the operator will be aware of all of the resonant frequencies of the workpiece 12. In the event the workpiece 12 is of acceptable quality the natural resonant frequencies obtained in the foregoing manner will correspond to some predetermined standard. However, in the event the workpiece 12 is defective and unacceptable, the natural resonant frequencies thereof will not correspond to this standard.

It will be seen that by employing the foregoing apparatus 10, it will be possible for even an inexperienced operator to make an automatic determination of all of the resonant frequencies of the workpiece 12. Since the human element has been eliminated, each of the resonant frequencies will be accurately measured with a high degree of repeatability. Moreover, even though one or more of the natural resonant frequencies are characterized by an extremely high Q, the instant de-energization of the drive motor 22 will insure all of the natural resonant frequencies being observed.

What is claimed is:

1. In a device for detecting flaws in a workpiece, the combination of a sweep frequency oscillator adapted to produce electrical oscillations, an electromechanical transducer connected to receive said oscillations and to induce mechanical vibrations in said workpiece, sweep means for automatically varying the frequency of said oscillations over a plurality of frequencies, a vibration pickup responsive to the amplitude of said vibrations induced in said workpiece, control means connected to said pickup and effective to de-activate said sweep means for preventing changes in the frequency of said oscillator whenever the amplitude of said vibrations is greater than some predetermined amount.

2. Apparatus for detecting flaws in a workpiece by determining a natural resonant frequency thereof, said apparatus comprising a sweep frequency oscillator adapted to produce electrical oscillations, an electromechanical transducer connected to receive said oscillations and to induce mechanical vibrations in said workpiece, sweep means for automatically varying the frequency of said oscillations over a plurality of frequencies, a vibration pickup responsive to the amplitude of said vibrations induced in said workpiece and adapted to produce a signal in accordance therewith, control means responsive to said signal and effective to de-activate said sweep means for preventing changes in the frequency of said oscillator whenever the frequency of the induced vibrations is equal to a natural resonant frequency in said workpiece at which resonant frequency the amplitude of said signal is greater than a predetermined amount, and, an indicator effective to indicate said resonant frequency.

3. In a device for detecting flaws in a workpiece, the combination of a driver adapted to induce variable frequency mechanical vibrations in said workpiece, a sweep frequency oscillator operatively interconnected with said driver for actuation thereof, sweep means interconnected with said oscillator for varying the frequency thereof to thereby cause said oscillator to scan a frequency spectrum, a vibration pickup responsive to the amplitude of the vibrations induced in said workpiece and adapted to produce a signal in accordance therewith, control means responsive to said signal and connected with said sweep means and adapted to de-activate said sweep means when said signal exceeds a given amplitude for preventing said oscillator from scanning said spectrum and thereby preventing any changes in the frequency of said vibrations induced in said workpiece whenever the amplitude thereof is greater than some predetermined amount.

4. In a device for detecting flaws in a workpiece by determining a natural resonant freqency thereof, the combination of a driver adapted to induce variable frequency mechanical vibrations in said workpiece, a sweep frequency oscillator operatively interconnected with said driver for actuation thereof, sweep means interconnected with said oscillator for varying the frequency thereof to thereby cause said oscillator to scan a frequency spectrum, a vibration pickup responsive to the amplitude of the vibrations induced in said workpiece and adapted to produce a signal in accordance therewith, control means responsive to said signal and having an output coupled to said sweep means, said control means being adapted to de-energize said sweep means for preventing said oscillator from scanning said spectrum and thereby preventing any changes in the frequency of said vibrations induced in said workpiece whenever said signal is equal to a predetermined amplitude occurring when the frequency of the induced vibrations is equal to a natural resonant frequency in said workpiece, and an indicator effective for indicating said resonant frequency of said vibrations.

5. Means for determining the natural resonant frequency of a workpiece comprising the combination of an oscillator adapted to produce electrical oscillations, an electromechanical transducer connected to receive said oscillations and adapted to induce vibrations in said workpiece, a mechanical drive for varying the frequency of said oscillator whereby said oscillator will scan a frequency spectrum, a pickup for sensing the vibrations induced in said workpiece and adapted to produce an electrical output in accordance therewith, an amplitude-responsive device having an input connected to said pickup to receive said electrical output and having an output coupled to said mechanical drive for de-energizing said drive whenever the amplitude of said vibrations is greater than some predetermined amount.

6. Means for determining the natural resonant frequency of a workpiece comprising the combination of an oscillator, an electromechanical transducer connected to said oscillator and adapted to induce vibrations in said workpiece, a mechanical drive for varying the frequency of said oscillator whereby said oscillator will scan a frequency spectrum, a pickup for sensing the vibrations induced in said workpiece and adapted to produce an electrical output in accordance therewith, an amplitude-responsive control device having an input connected to said pickup and an output coupled to said mechanical drive for de-energizing said drive whenever the amplitude of said vibrations is greater than some predetermined amount, and means for indicating the frequency of said vibrations.

7. Testing apparatus including an oscillator, drive means connected to said oscillator for inducing vibrations in a workpiece, control means for automatically varying the frequency of said oscillator over a plurality of frequencies, pickup means for detecting vibrations induced in said workpiece, and amplitude-responsive means connected to said pickup means and having an output coupled to said control means, said amplitude-responsive means being effective to de-activate said control means to prevent a change in the frequency of said oscillations upon the occurrence of vibrations in said workpiece of a predetermined amplitude.

References Cited in the file of this patent

UNITED STATES PATENTS

| | | |
|---|---|---|
| 2,384,716 | Wengel | Sept. 11, 1945 |
| 2,635,746 | Gordon | Apr. 21, 1953 |
| 2,846,874 | Horn | Aug. 12, 1958 |